Nov. 29, 1938.     G. E. MILLER     2,138,386
SAFETY LOAD HOLDING MEANS
Filed Aug. 7, 1937
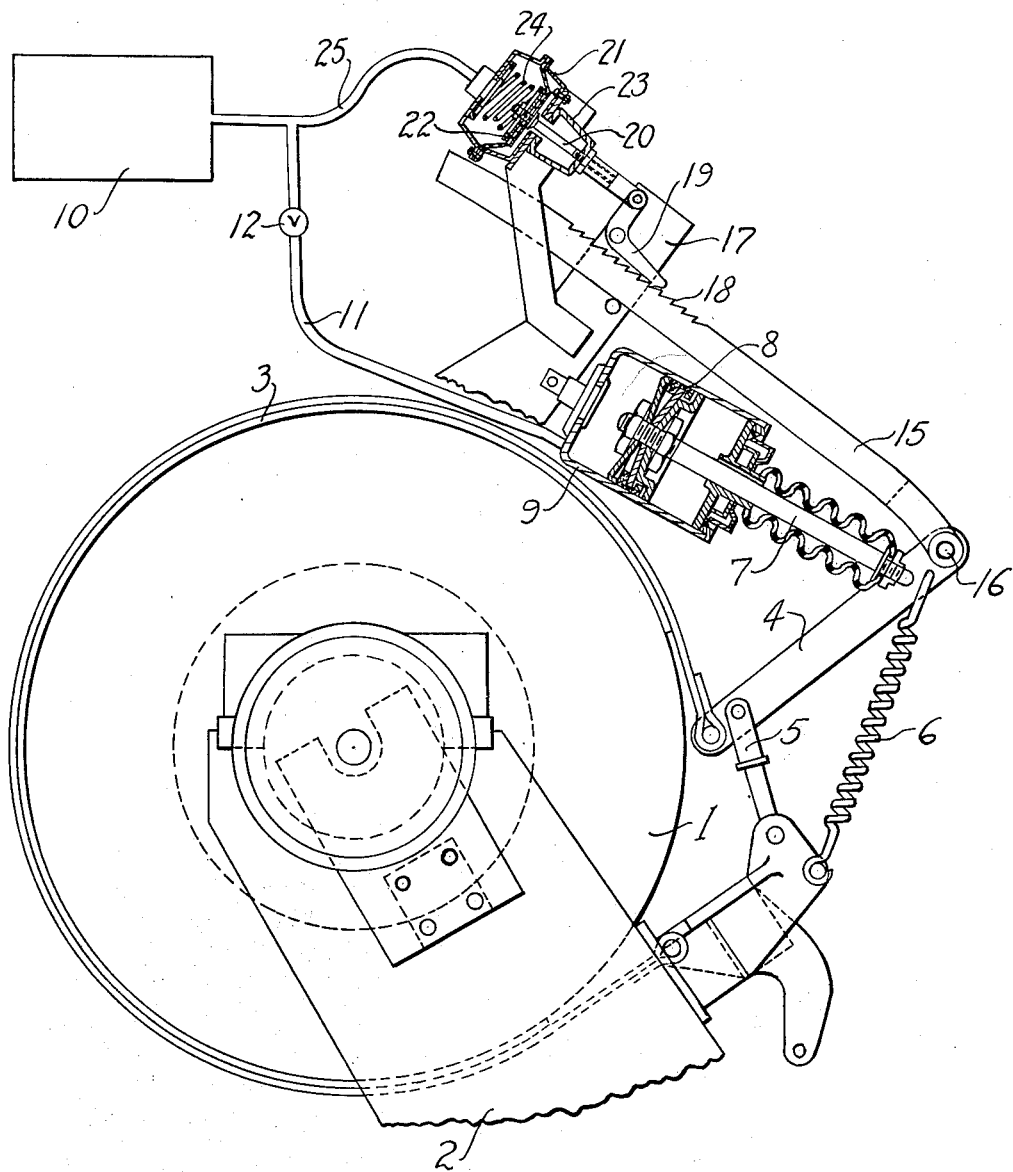
Inventor
George E. Miller
By Owen & Owen,
Attorneys Patented Nov. 29, 1938

2,138,386

UNITED STATES PATENT OFFICE 2,138,386

SAFETY LOAD HOLDING MEANS

George E. Miller, Findlay, Ohio, assignor to The Buckeye Traction Ditcher Company, Findlay, Ohio, a corporation of Ohio Application August 7, 1937, Serial No. 157,941

2 Claims. (Cl. 188—265)

This invention relates to safety means for use more particularly in connection with brakes controlled by different fluid pressure.

The object of the invention is the provision in connection with a fluid pressure control device, such for instance as a brake, of supplemental means which is automatically operable to maintain the device in an engaged position should the actuating differential fluid pressure drop below a predetermined value.

The invention is fully described in the following specification, and one form thereof illustrated in the accompanying drawing, in which the figure is a somewhat diagrammatical view showing the invention in connection with a vacuum actuated brake with parts in section and with the safety means in engaged position to prevent release of the brake.

In the present instance, the invention is illustrated in connection with a brake which is applied by vacuum action and has a mechanical catch device associated therewith, which latter becomes operative to hold the brake in engaged position should the vacuum holding pressure be reduced from any cause below a predetermined value necessary to apply or maintain the application of the brake. Such a device is particularly valuable for use in connection with load hoist drums.

Referring to the drawing, 1 designates a brake drum, 2 a mounting frame therefor, and 3 a brake band in engagement with the drum periphery. One end of the band is anchored to the frame 2 while its other end is attached to the short arm of a brake lever 4, which is fulcrumed to a link 5 attached to the frame.

A spring 6 connects the long arm of the lever 4 to the frame 2 and acts to normally maintain the lever in brake released position. Such end of the arm is also connected by a rod 7 to a piston 8 operating in a cylinder 9. The piston is actuated by differential fluid pressure in the cylinder to move the lever 4 to engage or release the brake, a movement of the piston to the left, or toward the outer end of the cylinder, in the present instance, applying the brake.

The differential fluid pressure is occasioned in the present embodiment of the invention by connecting the outer end of the cylinder 9 to a vacuum source, such as a vacuum tank 10, through a line 11 in which a control valve 12 is disposed, while the cylinder at the opposite side of the piston is subjected to atmospheric pressure in the usual or any suitable manner. It will, of course, be understood that a vacuum is maintained in the tank 10 by a pump, or other suitable means, no shown.

The feature embodying the improvement or safety lock of the invention includes a bar 15 pivoted at one end to the long arm of the brake lever 4, as at 16, and extending rearwardly therefrom in the direction of movement of such lever arm in applying the brake. This arm has guided engagement with a frame bracket 17 rising above the brake drum 1 and is provided on its top surface, in the present instance, with a series of notches forming teeth 18 which have their rear sides inclined and their forward sides at right angles to the bar edge. A dog 19 is pivoted to the frame part 17 at the notched side of the bar in position to have catch engagement with the teeth 18 and detain the bar against forward movement from the position in which it stands when the dog moves into engagement therewith. The dog is of bell crank lever form and has its rear end connected to a rod 20 which extends into a diaphragm chamber 21 and connects with a movable diaphragm 22 therein. A flexible boot 23 connects the rod 20 and adjacent end of the chamber 21 and is in communication with the interior of the chamber at the adjacent side of the diaphragm so that upon movements of the diaphragm air from the chamber may pass into and out of the boot. An expansion spring 24 is disposed within the chamber at the outer side of the diaphragm and acts on the diaphragm to normally retain the diaphragm at the limit of its forward movement with the dog 19 in catch engagement with the bar 15. The spring side of the diaphragm chamber is in constant communication with the vacuum tank 10 through a line 25.

When a sufficient vacuum is present in the tank 10 to maintain the brake band 3 in effective applied engagement with the drum 1, such vacuum action is sufficient to overcome the tension of the spring 24 and hold the dog 19 disengaged from the catch bar 15. It is apparent, however, that should the vacuum action on the diaphragm 22 be reduced from any cause to a point below that necessary to maintain the brake applied, the spring 24 will act to engage the dog 19 with the catch bar, thus retaining the brake in applied position, so that a load which the brake is sustaining will not be prematurely released. In practice, when the brake is used, for instance, in connection with the hoist drum of a bucket type of excavator, the pressure of the spring 24 against the diaphragm is set at approximately 15 lbs.

It is apparent that while the brake, in the present instance, is of the vacuum actuated type, thus requiring the safety catch means to be held in released position by the same action, the invention comprehends the use of any brake applying force which is effected by differential fluid pressures, and is therefore not necessarily restricted to vacuum action. It is also understood that while the load sustaining means, in the present instance, is a brake, it may be of any other type, as for instance a clutch.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In combination, a movable element, a normally released brake therefor, a lever connected to said brake, a vacuum source, a cylinder in controlled communication at one end with said source, a piston operating in said cylinder and connected to the said lever whereby it is vacuum actuated to apply the brake, a sliding catch bar pivotally connected to said lever, a dog for engagement with the catch bar to retain the brake in engaged position, and means connected to the dog and normally operable to retain the dog in catch engagement with said bar and being constantly vacuum actuated from said source to retain the dog in released position except when the vacuum action has been reduced a predetermined extent.

2. In combination, a movable element, a normally released brake therefore, a brake lever connected to said brake, a vacuum source, a cylinder, a conduit connecting the source and one end of said cylinder, a single normally closed valve in said conduit, a piston disposed in said cylinder and connected to the brake lever for actuating the latter and thereby the brake when the valve is opened, a second cylinder having constant communication with the conduit ahead of said valve, a slidable catch bar pivotally connected to the brake lever, a releasable dog for engaging the catch bar to hold the brake in its engaged position, a piston in the second cylinder connected to the dog for retaining the latter in released position while the vacuum source remains above a predetermined point, and spring means in the second cylinder for automatically actuating the dog to engaged position with the catch bar to hold the brake in applied position after the valve is opened, and in the event the pressure in the source drops below said predetermined point.

GEORGE E. MILLER.